(12) United States Patent
Capillo Carril

(10) Patent No.: US 11,520,825 B2
(45) Date of Patent: Dec. 6, 2022

(54) METHOD AND SYSTEM FOR CONVERTING ONE TYPE OF DATA SCHEMA TO ANOTHER TYPE OF DATA SCHEMA

(71) Applicant: Oracle International Corporation, Redwood Shores, CA (US)

(72) Inventor: Esteban Alejandro Capillo Carril, Redwood City, CA (US)

(73) Assignee: Oracle International Corporation, Redwood Shores, CA (US)

(*) Notice: Subject to any disclaimer, the term of this patent is extended or adjusted under 35 U.S.C. 154(b) by 454 days.

(21) Appl. No.: 16/786,331

(22) Filed: Feb. 10, 2020

(65) Prior Publication Data

US 2020/0233904 A1 Jul. 23, 2020

Related U.S. Application Data

(63) Continuation of application No. 15/692,934, filed on Aug. 31, 2017, now Pat. No. 10,642,895.

(60) Provisional application No. 62/395,206, filed on Sep. 15, 2016.

(51) Int. Cl.
*G06F 16/80* (2019.01)
*G06F 16/21* (2019.01)
*G06F 16/84* (2019.01)

(52) U.S. Cl.
CPC ............ *G06F 16/88* (2019.01); *G06F 16/211* (2019.01)

(58) Field of Classification Search
CPC ....................................................... G06F 16/88
See application file for complete search history.

(56) References Cited

U.S. PATENT DOCUMENTS

| | | | |
|---|---|---|---|
| 9,235,652 B1 | 1/2016 | Jeffrey | |
| 10,324,780 B2 * | 6/2019 | Andre | ..................... G06F 11/30 |
| 2002/0049740 A1 | 4/2002 | Arning | |
| 2007/0067348 A1* | 3/2007 | Andreyev | ............... G06F 16/93 |
| 2007/0282869 A1* | 12/2007 | Paulus | .................. G06F 16/972 |
| 2009/0248737 A1 | 10/2009 | Shukla | |
| 2011/0161375 A1* | 6/2011 | Tedder | .................. G06F 16/958 707/803 |
| 2014/0122996 A1* | 5/2014 | Gupta | ..................... G06F 9/451 715/234 |
| 2014/0310320 A1* | 10/2014 | Chen | ..................... G06F 16/258 707/809 |
| 2015/0356123 A1* | 12/2015 | Gorelik | ............... G06F 16/2465 715/765 |
| 2016/0180286 A1 | 6/2016 | Farley | |

* cited by examiner

*Primary Examiner* — Son T Hoang
(74) *Attorney, Agent, or Firm* — Trellis IP Law Group, PC

(57) ABSTRACT

In one implementation, a data transformation engine is employed to analyze an incoming JSON schema syntax and use a "best effort" model to convert a plurality of JSON schemas to other types of schemas such as an XML schema. The model is configured to be adaptable and dynamic in order to convert as much of the JSON as possible. In addition, the conversion tool is configured to transform schemas to other technologies and allow for conversion errors within one or more error thresholds. Further, the system may be distributed standalone with no dependencies to other implementations, such as BPM implementations.

18 Claims, 10 Drawing Sheets

Schema A to Schema B conversion

Author: Esteban Capillo

Abstract

Utility to convert one Schema to another Schema

Example

```
                        Calendar (Json)
{
"$schema": "http://json-schema.org/draft-04/schema#",
"description": "A representation of an event",
"type": "object",
"required": [ "dtstart", "summary" ],
"properties": {
  "dtstart": {
    "format": "date-time",
    "type": "string",
    "description": "Event starting time"
  },
  "dtend": {
    "format": "date-time",
    "type": "string",
    "description": "Event ending time"
  },
  "summary": { "type": "string" },
  "location": { "type": "string" },
  "url": { "type": "string", "format": "uri" },
  "duration": {
    "format": "time",
    "type": "string",
    "description": "Event duration"
  },
  "rdate": {
    "format": "date-time",
    "type": "string",
    "description": "Recurrence date"
```

FIG. 5A

```
      },
      "rrule": {
        "type": "string",
        "description": "Recurrence rule"
      },
      "category": { "type": "string" },
      "description": { "type": "string" },
      "geo": { "$ref": "#/definitions/geo" }
      },
      "category": { "type": "string" },
      "description": { "type": "string" },
      "geo": { "$ref": "#/definitions/geo" }
  },
  "definitions": {
    "geo": {
      "type" : "object",
      "properties" : {
        "latitude": {
          "type": "number"
        },
        "longitude": {
          "type": "number"
        }
      }
    }
  }
}
```

FIG. 5B

```
                                Calendar (Json)

<?xml version = '1.0' encoding = 'UTF-8'?>
<schema targetNameSpace="calendarNS" xmlns:jnsl="CalendarNS"
elementFormDefault="qualified"
xmlns:bpmo="http://xmlns.example.com/bpm/bpmobject/"
xmlns=http://www.w3.org/2001/XMLSchema">
   <complexType name="calendar">
      <sequence>
         <element name="category" type="string" minOccurs="0"/>
         <element name="description" type="string" minOccurs="0"/>
         <element name="detend" type="dateTime" minOccurs="0"/>
         <element name="dtstart" type="dateTime"/>
         <element name="duration" type="time" minOccurs="0"/>
         <element name="geo" type="jsnl:geo" minOccurs="0"/>
         <element name="location" type="string" minOccurs="0"/>
         <element name="rdate" type="dateTime" minOccurs="0"/>
         <element name="rrule" type="string" minOccurs="0"/>
         <element name="summary" type="string"/>
         <element name="url" type="string" minOccurs="0"/>
      </sequence>
   </complexType>
   <complexType name="geo">
      <sequence>
         <element name="latitude" type="double" minOccurs="0"/>
         <element name="longitude" type="double" minOccurs="0"/>
      </sequence>
   </complexType>
   <element name="calendar" type="jsnl:calendar"/>
   <annotation>
      <documentation source="json/schema">{
"$schema" : "http://json-schema.org/draft-04/schema#",
"description" : "A representation of an event",
"type" : "Object",
"required" : [ "dtstart", "summary" ],
"properties" : {
  "dtstart" : {
    "format" : "date-time",
    "type" : "string",
    "description" : "Event starting time"
  },
  "dtend" : {
    "format" : "date-time",
    "type" : "string",
    "description" : "Event ending time"
```

FIG. 5C

```
        },
        "summary" : {
          "type" : "string"
        },
        "location" : {
          "type" : "string"
        },
        "url" : { "type" : "string",
          "format" : "uri"
        },
        "duration" : {
          "format" : "time",
          "type" : "string",
          "description" : "Event duration"
        },
        "rdate" : "date-time",
          "format" : "string",
          "type" : "string",
          "description" : Recurrence date"
        },
        "rrule" : {
          "type" : "string",
          "description" : Recurrence rule"
        },
        "category" : {
           "type" : "string"
        },
        "description" : {
           "type" : "string"
        },
        "geo" : {
           "$ref" : "#/definitions/geo"
        }
      },
      "definitions" : {
        "geo" : {
          "type" : "object",
          "properties" : {
            "latitude" : {
              "type" : "number"
            },
            "longitude" : {
              "type" : "number"
            }
          }
        }
      }
```

FIG. 5D

METHOD AND SYSTEM FOR CONVERTING ONE TYPE OF DATA SCHEMA TO ANOTHER TYPE OF DATA SCHEMA

CROSS REFERENCES TO RELATED APPLICATIONS

This application is a continuation of the following application, U.S. patent application Ser. No. 15/692,934, entitled METHOD AND SYSTEM FOR CONVERTING ONE TYPE OF DATA SCHEMA TO ANOTHER TYPE OF DATA SCHEMA, filed on Aug. 31, 2017 (ORACP0176), which claims priority of, and the benefit of, U.S. Provisional Patent Application Ser. No. 62/395,206, entitled JSON SCHEMA TO XML SCHEMA CONVERTER, filed on Sep. 15, 2016 (ORACP0176P) which are all hereby incorporated by reference as if set forth in full in this application for all purposes.

This application is related to the following application, U.S. Provisional Patent Application Ser. No. 62/395,341, entitled SYSTEM FOR PROCESS CLOUD SERVICE, filed on Sep. 15, 2016 (ORACP0192P), which are all hereby incorporated by reference as if set forth in full in this application for all purposes.

BACKGROUND

The following relates to converting schemas, such as Javascript Object Notation (JSON) schema, to another schema, such as an Extensible Markup Language (XML) schema. More specifically the following relates to a utility used to convert a JSON schema to an XML schema.

JSON schema may be considered a new technology relative to XML schema. As described by the JSON specification "JSON schema" version 4 (JSON-SCHEMA.ORG), herein incorporated by reference, a JSON schema is used to describe a JSON data format.

As such, a JSON schema is considered a JSON type of media that is used to define the structure of JSON data. JSON schemas provide context for JSON data used with a particular application and how the JSON data interacts with the application.

In short, a JSON schema is intended to be used to for validating and documenting instances of JSON data, and providing hyperlink navigation and interaction control over JSON data.

Unfortunately, there are currently no tools that effectively accomplish converting a schema that may contain errors, such as JSON schema, to another XML schema without failure. For example, current JSON schema to XML schema converters fail every time they do not understand a structure.

SUMMARY

In one implementation a conversion utility is configured to provide backward compatibility between JSON schema and XML schema, since systems often use both XML schemas alongside with JSON schema technology to maintain data continuity.

In other implementations, a data engine is employed to analyze an incoming JSON syntax and use a "best effort" schema to convert a plurality of JSON syntaxes to XML. The schema is configured to be adaptable and dynamic in order to convert as much of the JSON as possible without stopping or crashing the conversion process, e.g., having a failure or data conversion interruption. The process allows for error and/or data interruption thresholds that may be used to set an acceptable level of errors and/or interruptions.

In addition, this tool is configured to transform JSON schemas to other technologies. Further, the system may be distributed standalone with no dependencies to other implementations, such as Business Process Management (BPM) implementations.

In other implementations, a data engine analyzes the efficiency of the processor and dynamically adjusts the conversion based on the number of available processor threads in order to improve and/or establish desired processor efficiency during conversion. For example, in other implementations, the data engine may be configured to adjust the conversion process to allow for more or less processor efficiency depending on a user establishing a desired processing conversion rate or efficiency threshold.

A further understanding of the nature and the advantages of particular embodiments disclosed herein may be realized by reference of the remaining portions of the specification and the attached drawings.

BRIEF DESCRIPTION OF THE DRAWINGS

FIGS. 5A-5B is a high level illustration of an example single JSON calendar schema input to a conversion interface for conversion to XML calendar schema output illustrated in FIGS. 5C-5D using implementations described herein.

FIGS. 5C-5D is a high level illustration of an example XML calendar schema output from a single JSON schema input illustrated in FIGS. 5A-5B using implementations described herein.

DETAILED DESCRIPTION OF EMBODIMENTS

Figure 1:
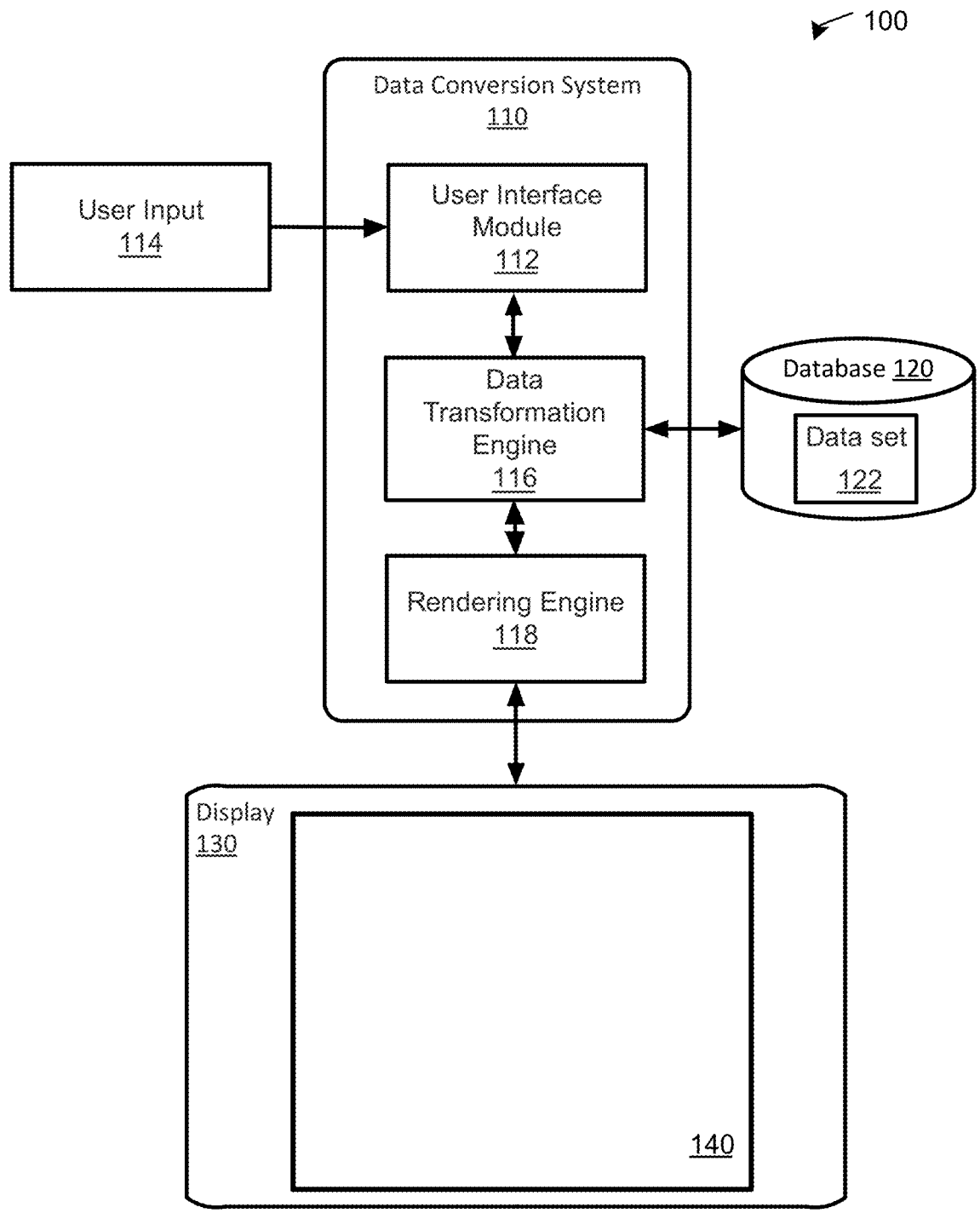
FIG. 1 is a high level illustration of a computing system used for transforming data from one form to another form.

FIG. 1 is a high-level block diagram of an exemplary computing system 100 for converting data. Computing system 100 may be any computing system, such as an enterprise computing environment, client-server system, and the like. Computing system 100 includes data conversion system 110 configured to process data received from a user interface 114, such as a keyboard, mouse, etc., with regard to processes such as converting, modeling, data binding, maintenance, etc., associated with data elements, information, and the like as described herein.

Note that the computing system 100 presents a particular example implementation, where computer code for implementing embodiments may be implemented, at least in part, on a server. However, embodiments are not limited thereto. For example, a client-side software application may implement data conversion system 110, or portions thereof, in accordance with the present teachings without requiring communications between the client-side software application and a server.

In one exemplary implementation, data conversion system 110 may be connected to display 130 configured to display graphical data 140, for example, to a user thereof. Display 130 may be a passive or an active display, adapted to allow a user to view and interact with graphical data 140 displayed thereon, via user interface 114. In other configurations, display 130 may be a touch screen display responsive to touches, gestures, swipes, and the like for use in interacting with and manipulating data 140 by a user thereof. Gestures may include single gestures, multi-touch gestures, and other combinations of gestures and user inputs adapted to allow a user to convert, model, generate, deploy, and maintain data 140.

In other implementations, computing system 100 may include a data source such as database 120. Database 120 may be connected to the data conversion system 110 directly or indirectly, for example via a network connection, and may be implemented as a non-transitory data structure stored on a local memory device, such as a hard drive, Solid State Drive (SSD), flash memory, and the like, or may be stored as a part of a Cloud network, as further described herein.

Database 120 may contain data sets 122. Data sets 122 may include data as described herein. Data sets 122 may also include data pertaining to schemas, data attributes, data models, data structures, data hierarchy, nodal positions, values, summations, visualizations, algorithms, code (e.g., Javascript, JSON, XSD, XML, etc.), source, security, hashes, and the like. In addition, data sets 122 may also contain other data, data elements, and information such as metadata, labels, development-time information, run-time information, configuration information, API, interface component information, library information, error threshold data, pointers, and the like.

Data conversion system 110 may include user interface module 112, data transformation engine 116, and rendering engine 118. User interface module 112 may be configured to receive and process data signals and information received from user interface 114. For example, user interface module 112 may be adapted to receive and process data from user input associated with data 140 for processing via data conversion system 110.

In an exemplary implementation, data transformation engine 116 may be adapted to receive data from user interface 114 and/or database 120 for processing thereof. In one configuration, data transformation engine 116 is a software engine configured to receive and process input data from a user thereof pertaining to data 140 from user interface module 114 and/or database 120 in order to convert schemas and data 140 from one form, such as JSON, to another form, such as XML, which may be responsive to one or more conversion error thresholds. For example, some conversion error thresholds may be set for benign errors and/or for other types of user and/or system acceptable errors thereby providing for an adjustable schema conversion tolerance.

For example, data transformation engine 116 may allow for schema conversion with an acceptable threshold level of conversion errors, such as errors of certain types, acceptable errors, reference errors, and the like. Data transformation engine 116 may also be used to correct and resolve such errors or on the fly, with or without warnings given to a user thereof, for example, by using techniques such as solving references, assigning target "QNames," specifying relative routes, etc.

Data transformation engine 116 in other implementations may be configured as a data analysis tool to perform analysis functions associated with data 140. Such analysis functions may include determining the attributes associated with the data, determining the type of data, types of schemas, determining the values of the data, determining the relationships to other data, interpreting metadata associated with the data, determining error types, tolerance data, and the like. For example, data transformation engine 116 may be configured to receive and analyze data sets 122 to determine types of errors, error tolerance levels, schema types, user interface configuration, data processing instructions, data attributes, data hierarchy, nodes, nodal positions within the hierarchy, values, summations, algorithms, source, security, hashes, and the like, associated with data sets 122.

Data transformation engine 116 may receive existing data sets 122 from database 120 for processing thereof. Such data sets 122 may include and represent a composite of separate data sets 122 and data elements pertaining to, for example, organizational data, which may include data such as employment data, salary data, personnel data, and the like. In addition, data sets 122 may include other types of data, data elements, and information such as contact data, sales data, production data, scientific data, financial data, medical data, census data, and the like.

Rendering engine 118 may be configured to receive configuration data pertaining to data 140, associated data sets 122, and other data associated with data 140 such as user interface components, icons, user pointing device signals, and the like, used to render data 140 on display 130. In one exemplary implementation, rendering engine 118 may be configured to render 2D and 3D graphical models and simulations to allow a user to obtain more information about data sets 122 associated with data 140. In one implementation, upon receiving instruction from a user, for example, through user interface 114, rendering engine 118 may be configured to generate a real-time display of interactive changes being made to data 140 by a user thereof.

In an implementation, a data conversion utility as described herein may be employed, for example, by data conversion system 110, to transform one or more schemas, such as a JSON schema, to one or more other types of schemas, such as XML schemas, where a conversion context may be introduced to solve references and assign targets such as "QNames" and relative routes. The use of references may depend on the context of the conversion. For example, a JSON schema may include the "$id" field to where "$ref" points to.

In other implementations, as described herein, a transformation tool is implemented, for example by data conversion system 110, using a pattern, such as a "visitor" pattern, so that the conversion tool may be easily extended to provide transformation to technologies other than XML. In some implementations, the visitor may be a JSON schema builder program that inspects the JSON schema model generated during the parsing phase and produces an output schema document for use thereof.

In some implementations, visitor patterns may be configured to analyze the data hierarchy of the JSON schema using one or more types of nodal traversal techniques. For example, visitor pattern may traverse the root schema in order to determine whether the type of nodes are known or unknown.

In one example, if JSON types are unknown, the visitor pattern actively skips the associated node and any leaf nodes. The active skipping feature of the transformation tool increase processing efficiency by effectively truncating any nodes that are not defined.

In one implementation a valid block may define either a type, enum, or $ref keywords. (referred to as "type", "enum"

or "$ref" block) The root block may be a type block such as an "object" type, or an "enum" block.

In other implementations, Blocks not identified as type, enum or $ref may be ignored.

TABLE 1

| "type" | "format" | Xml Mapping |
|---|---|---|
| array | * | xs:sequence |
| boolean | * | xs:boolean |
| integer | * | xs:integer |
| number | * | xs:double |
| null | * | xs:restriction base xs:string to only one value: "null" |
| object | * | xs:complexType |
| string | * | xs:string |
| string | date-time | xs:dateTime |
| string | date | xs:date |
| string | time | xs:time |

Note that * means that either format is not defined or has any value. In both cases, such may be ignored for the conversion.

Table 1 illustrates a mapping between JSON data types and XML data types.

In other implementations, root definitions may be taken into account, that is, types may or may not be defined in non-root blocks.

Local definitions may be referenced by #/definitions/<local_name>

Keywords allOf, anyOf, oneOf may be used to map to xs:anyType since there is not translation to an XML schema structure.

Figure 2:
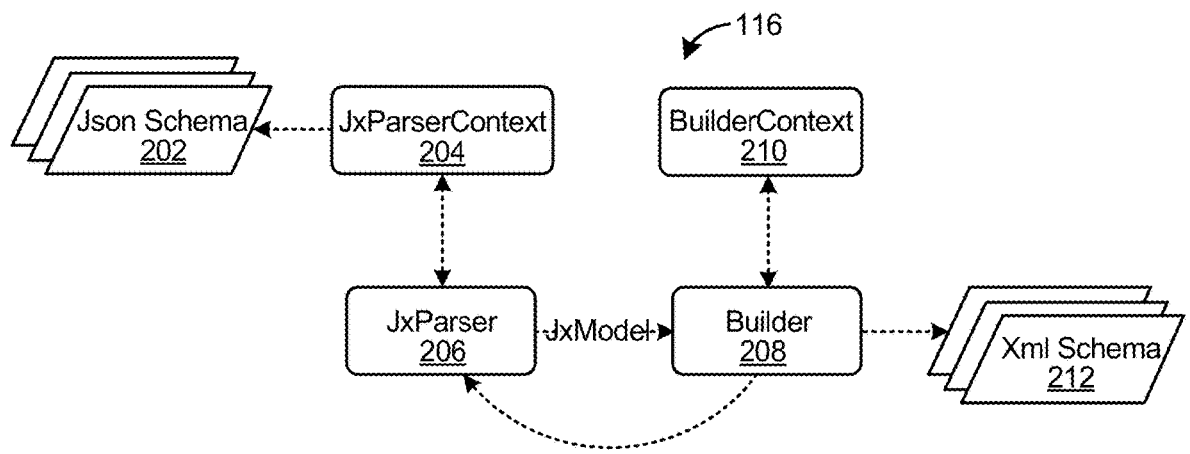
FIG. 2 is a functional diagram of a JSON to XML transformer.

FIG. 2 is a high level functional diagram of data transformation engine 116 converting one type of schema, such as JSON, to another type of schema, such as an XML schema. In one implementation, data transformation engine 116 includes a parsing context 204 (e.g., JXParserContext), a data parsing function 206 (e.g., JxParser), a builder function 208 (e.g., Builder), and a builder context function 210 (e.g., Builder Context).

In an implementation, data-parsing function 206 receives one or more JSON schema streams 202. At least one of these JSON streams is designated the ROOT. During the parsing process, parsing context 204 receives values from metadata fields that are specified in the context of the JSON schema streams 202. As such, a user may provide their own parser context so that extra metadata can be collected from the JSON schema streams 202. Metadata may also include keys that are customized for the context and that are not part of a JSON schema standard. For example, a user may want to define a custom key such as "$my_property" key, that contains information relevant to the user. In this scenario, since the user defined a custom key, the data in the custom key could be used later by any other user of the output model (e.g., JxModel).

Data parsing function 206 parses the context and the JSON schema streams into parsed schema data and generates a schema model (e.g. JxModel) that is provided to builder function 208. At this juncture, builder function 208 processes the schema model structure received from data parsing function 206 in relation to the builder context 210 using, for example, a visitor program in conjunction with a transformation algorithm, table (e.g., Table 1), and the like.

Builder function 208 processes the model by traversing the nodes of the model generated by the data parsing function 206, and access context information of the model, such as namespace, base directory, etc., using the builder context 210. Thus, using the information obtained by the nodal traversal and the builder context 210, builder function 208 builds one or more output schemas, such as an XML schema 212.

In one implementation, builder function 208 operates in a "best effort" mode that allows the transformation of, for example, JSON schema to XML schema, that ignores data, attributes, and variables that may not be necessary to produce the resulting output schema 212, or may produce an output schema 212 to an acceptable error threshold level. As such, by ignoring information that may be ignored such as non-relevant information, user defined ignorable information, and the like, builder function 208 increases the processing speed and efficiency of the computer to build the output schema 212. Thus, builder function 208 may be configured to adjust the conversion efficiency and/or tolerance based on conversion context (e.g. builder context 210) to solve references (e.g., resolve, correct, etc.), assign target names and relative routes, etc.

In other implementations, conversion context may be adjusted to allow the data conversion, for example, by the builder function 208, to be more or less tolerant of objects such as references, target names, relative routes, etc. For example, target names context may be set to be tolerant of text case variations, character string length, character types, symbols, and the like.

Figure 3:
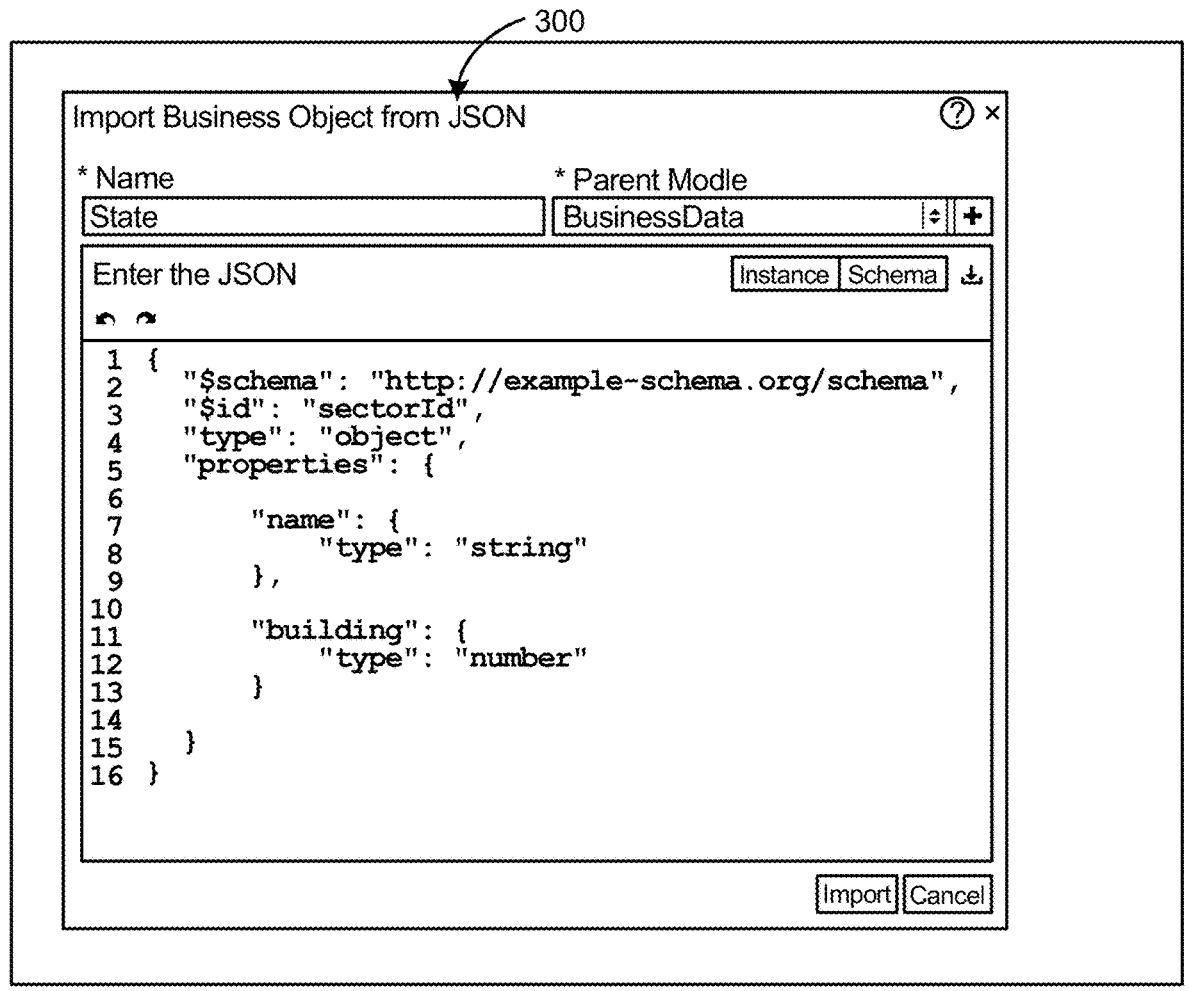
FIG. 3 is a high level illustration of a JSON schema transformation tool user interface.
Figure 4:
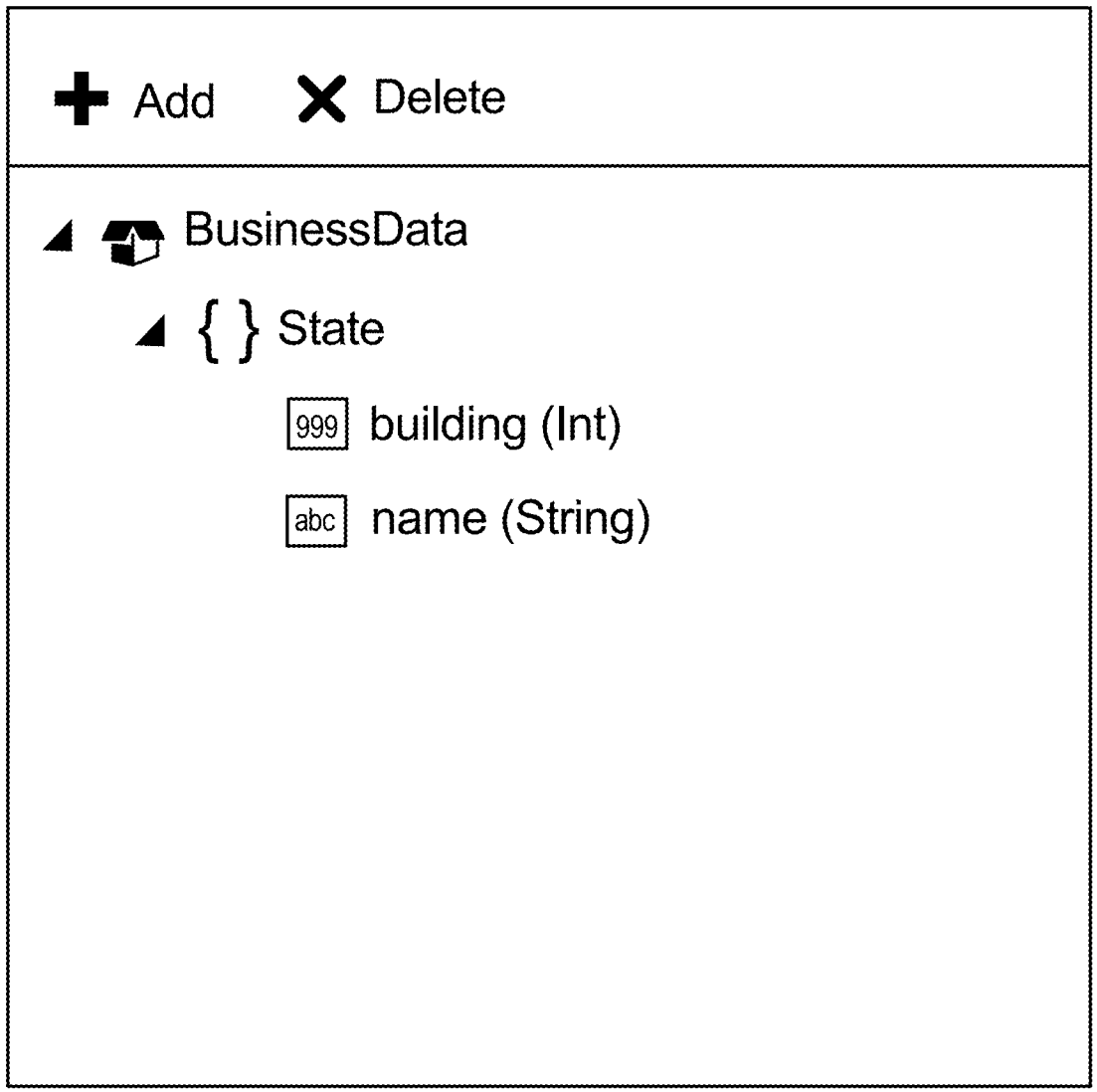
FIG. 4 is a high level illustration of a JSON schema output conversion to XML schema.

FIG. 3 is a high level illustration of a user interface 300 for data transformation engine 116. In this implementation, a file containing one or more JSON schemas is inputted into user interface 300 using, for example, business objects imported from a file via an import interface 400 as illustrated in FIG. 4. Using the process described herein with regard to data transformation engine 116, such imported JSON schema data is converted to XML schema output as illustrated in FIGS. 5A-5D described below.

FIGS. 5A-5D are high level illustrations of an example single JSON schema input illustrated in a conversion interface 500, and resultant XML schema output. For example, FIGS. 5A-5B illustrate a calendar JSON schema input 510, and FIGS. 5C-5D illustrate a calendar XML schema output 520, converted using implementations described herein to convert such JSON schema to an XML schema. In FIGS. 5A-5B, the JSON schema conversion utilizes a JSON schema standard from JSON-SCHEMA.ORG, however, other schema protocols, specifications, and the like, and variations thereof, may be used. Upon processing using error and context tolerance mechanisms described herein, FIGS. 5C-5D illustrate the resulting calendar XML schema.

Figure 6:
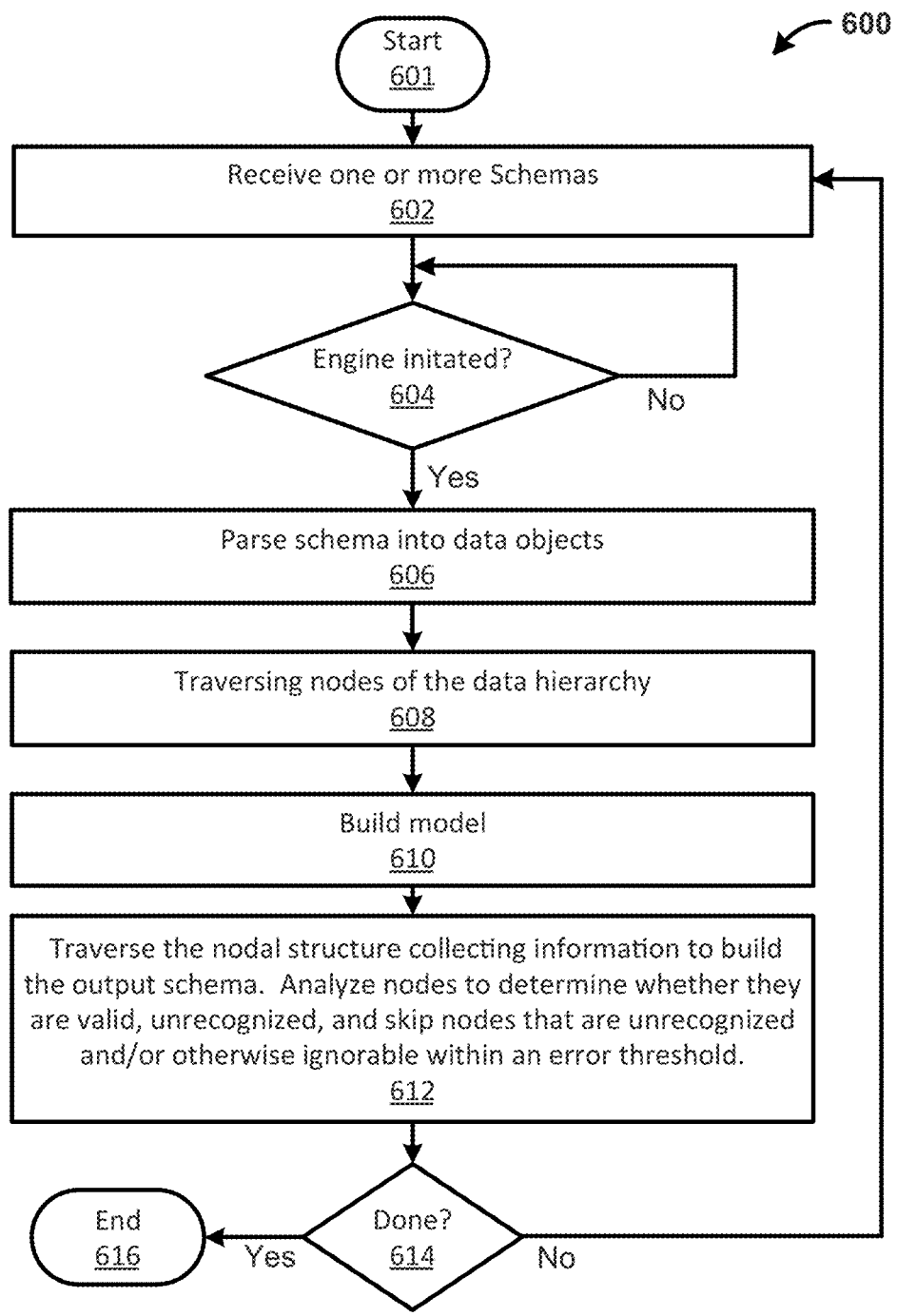
FIG. 6 is a flow diagram of an example method adapted for use with implementations, and variations thereof, illustrated in FIGS. 1-5.

FIG. 6 is a flow diagram of an example method 600 adapted for use with implementations, and variations thereof, illustrated in FIGS. 1-6. Method 600 may be entered into at 601 when, for example, data conversion system 110 is invoked.

At 602 one or more schemas such as JSON schemas are received to be processed. At 604, method 600 determines whether data transformation engine 116 has been initiated, for example, by a user invoking data transformation engine 116 from a terminal command line.

At 606, method 600 parses schema into data objects. For example, method 600 may parse a JSON schema into JSON data objects connected through a data hierarchy.

At 608, method 600 traverses nodes of the data hierarchy. At 610, method 600 builds a data hierarchy model of the data hierarchy.

At 612, method 600 traverses the nodal structure analyzing each node to determine whether the type of data objects is known, unknown, or flagged, according to a mapping such as found in Table 1. If the type of data object is known, method 600 proceeds to traverse at least one leaf node of the branch defining the data object. However, if the data object is unknown, flagged to ignore, or otherwise deemed to be tolerable within one or more acceptable error thresholds, method 600 proceeds to another node of the hierarchy.

In some implementations, to allow for different levels of "best effort" error tolerance, one error threshold may be used to set one limit of error tolerance, a second error threshold level may be used to set another level of error tolerance, and so on. Advantageously, utilizing differing error threshold levels allows a user to tailor schema conversion processing to meet a wide range of requirements and needs such as processing efficiency, speed, tolerance, flexibility, and the like.

At 614, method 600 if the schema conversion process is done, method proceeds to 616 and ends. However, if the schema conversion process is not done, method 600 proceeds to 602.

Figure 7:
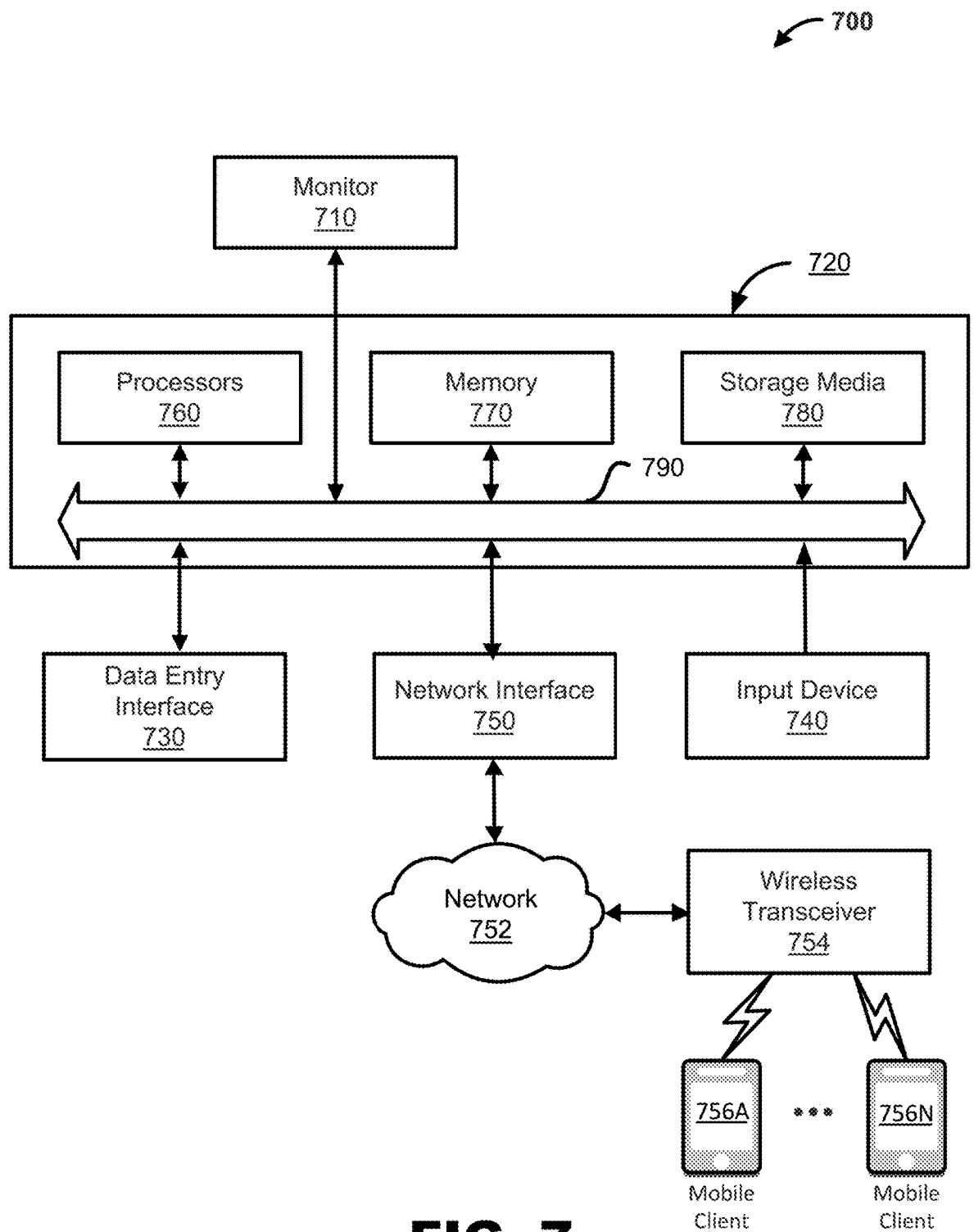
FIG. 7 is a high-level block diagram of an exemplary computer and communication system.

FIG. 7 is a block diagram of an exemplary computer system 700 for use with implementations described herein. Computer system 700 is merely illustrative and not intended to limit the scope of the claims. One of ordinary skill in the art would recognize other variations, modifications, and alternatives. For example, computer system 700 may be implemented in a distributed client-server configuration having one or more client devices in communication with one or more server systems.

In one exemplary implementation, computer system 700 includes a display device such as a monitor 710, computer 720, a data entry device 730 such as a keyboard, touch device, and the like, a user input device 740, a network communication interface 750, and the like. User input device 740 is typically embodied as a computer mouse, a trackball, a track pad, wireless remote, tablet, touch screen, and the like. Moreover, user input device 740 typically allows a user to select and operate objects, icons, text, characters, and the like that appear, for example, on the monitor 710.

Network interface 750 typically includes an Ethernet card, a modem (telephone, satellite, cable, ISDN), (asynchronous) digital subscriber line (DSL) unit, and the like. Further, network interface 750 may be physically integrated on the motherboard of computer 720, may be a software program, such as soft DSL, or the like.

Computer system 700 may also include software that enables communications over communication network 752 such as the HTTP, TCP/IP, RTP/RTSP, protocols, wireless application protocol (WAP), IEEE 802.11 protocols, and the like. In addition to and/or alternatively, other communications software and transfer protocols may also be used, for example IPX, UDP or the like. Communication network 752 may include a local area network, a wide area network, a wireless network, an Intranet, the Internet, a private network, a public network, a switched network, or any other suitable communication network, such as for example Cloud networks. Communication network 752 may include many interconnected computer systems and any suitable communication links such as hardwire links, optical links, satellite or other wireless communications links such as BLUETOOTH, WIFI, wave propagation links, or any other suitable mechanisms for communication of information. For example, communication network 752 may communicate to one or more mobile wireless devices 756A-N, such as mobile phones, tablets, and the like, via a base station such as wireless transceiver 754.

Computer 720 typically includes familiar computer components such as a processor 760, and memory storage devices, such as a memory 770, e.g., random access memory (RAM), storage media 780, and system bus 790 interconnecting the above components. In one embodiment, computer 720 is a PC compatible computer having multiple microprocessors, graphics processing units (GPU), and the like. While a computer is shown, it will be readily apparent to one of ordinary skill in the art that many other hardware and software configurations are suitable for use with the present invention. Memory 770 and Storage media 780 are examples of tangible non-transitory computer readable media for storage of data, audio/video files, computer programs, and the like. Other types of tangible media include disk drives, solid-state drives, floppy disks, optical storage media such as CD-ROMS and bar codes, semiconductor memories such as flash drives, flash memories, read-only-memories (ROMS), battery-backed volatile memories, networked storage devices, Cloud storage, and the like.

Although the description has been described with respect to particular embodiments thereof, these particular embodiments are merely illustrative, and not restrictive. Further details of embodiments may be found in the attached documents provided with this application.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise. Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory computer readable medium including one or more instructions executable by one or more processors for:
   receiving schema data;
   extract values from metadata fields of the received schema data to form parsed schema data;
   receiving a first set of context information for converting the parsed schema data to an output schema;
   receiving builder context information of a schema model of the output schema;
   adjusting a tolerance level for particular error types for particular objects of the schema model based on the builder context information;
   processing the parsed schema data and the first set of context information to build the schema model, wherein the schema model represents a conjunction of the schema data with the first set of context information;
   traversing nodes of the schema model to access the parsed schema data and the first set of context information, responsive to a current error threshold level of a plurality of error threshold levels;
   ignoring the particular error types for the particular objects of the nodes based on the current error threshold level; and
   generating the output schema from the parsed schema data, the first set of context information, and a second set of context information according to the current error threshold level.

2. The non-transitory computer readable medium of claim 1, wherein the current error threshold level is selected to achieve a target speed or target efficiency.

3. The non-transitory computer readable medium of claim 2, wherein the traversing the nodes includes skipping particular nodes determined to be of unknown types.

4. The non-transitory computer readable medium of claim 1, wherein the traversing the nodes includes ignoring at least one of data, attributes, or variables determined as unnecessary to generate the output schema within the current error threshold level.

5. The non-transitory computer readable medium of claim 1, wherein the traversing the nodes includes adjusting the first set of context information to modify the tolerance level of the particular objects.

6. The non-transitory computer readable medium of claim 5, wherein the particular objects include target names and the adjusting the first set of context information includes modifying the tolerance level to at least one of text case variations, character string lengths, character types, or symbols.

7. The non-transitory computer readable medium of claim 1, wherein the receiving the first set of context information further comprises receiving conversion context employed to resolve at least one error.

8. A computer implemented method comprising:
   receiving schema data;
   extract values from metadata fields of the received schema data to form parsed schema data;
   receiving a first set of context information for converting the parsed schema data to an output schema;
   receiving builder context information of a schema model of the output schema;
   adjusting a tolerance level for particular error types for particular objects of the schema model based on the builder context information;
   processing the parsed schema data and the first set of context information to build the schema model, wherein the schema model represents a conjunction of the schema data with the first set of context information;
   traversing nodes of the schema model to access the parsed schema data and the first set of context information, responsive to a current error threshold level of a plurality of error threshold levels;
   ignoring the particular error types for the particular objects of the nodes based on the current error threshold level; and
   generating the output schema from the parsed schema data, the first set of context information, and a second set of context information according to the current error threshold level.

9. The computer implemented method of claim 8, wherein the current error threshold level is selected to achieve a target speed or target efficiency.

10. The computer implemented method of claim 8, wherein the traversing the nodes includes ignoring at least one of data, attributes, or variables determined as unnecessary to generate the output schema within the current error threshold level.

11. The computer implemented method of claim 8, wherein the traversing the nodes includes adjusting the first set of context information to modify the tolerance level to the particular objects.

12. The computer implemented method of claim 11, wherein the particular objects include target names and the adjusting the first set of context information includes modifying the tolerance level of at least one of text case variations, character string lengths, character types, or symbols.

13. The computer implemented method of claim 8, wherein the receiving the first set of context information further comprises receiving conversion context employed to resolve at least one error.

14. An apparatus for converting schemas in a computing environment, the computing environment comprising one or more computing devices in communication with a data conversion utility that executes software configured to convert information accessible to the one or more computing devices, a computing device of the one or more computing devices configured to:
   receiving schema data;
   extract values from metadata fields of the received schema data to form parsed schema data;
   receiving a first set of context information for converting the parsed schema data to an output schema;
   receiving builder context information of a schema model of the output schema;
   adjusting a tolerance level for particular error types for particular objects of the schema model based on the builder context information;
   processing the parsed schema data and the first set of context information to build the schema model, wherein the schema model represents a conjunction of the schema data with the first set of context information;

traversing nodes of the schema model to access the parsed schema data and the first set of context information, responsive to a current error threshold level of a plurality of error threshold levels;

ignoring the particular error types for the particular objects of the nodes based on the current error threshold level; and generating the output schema from the parsed schema data, the first set of context information, and a second set of context information according to the current error threshold level.

15. The apparatus of claim 14, wherein the current error threshold level is selected to achieve a target speed or target efficiency.

16. The apparatus of claim 14, wherein the traversing the nodes includes ignoring at least one of data, attributes, or variables determined as unnecessary to generate the output schema within the current error threshold level.

17. The apparatus of claim 14, wherein the traversing the nodes includes adjusting the first set of context information to modify the tolerance level of the particular objects.

18. The apparatus of claim 14, wherein the receiving the first set of context information further comprises receiving conversion context employed to resolve at least one error.

* * * * *

UNITED STATES PATENT AND TRADEMARK OFFICE
CERTIFICATE OF CORRECTION

| | | |
|---|---|---|
| PATENT NO. | : 11,520,825 B2 | Page 1 of 1 |
| APPLICATION NO. | : 16/786331 | |
| DATED | : December 6, 2022 | |
| INVENTOR(S) | : Esteban Alejandro Capillo Carril | |

It is certified that error appears in the above-identified patent and that said Letters Patent is hereby corrected as shown below:

In the Drawings

On sheet 9 of 10, in FIG. 6, and on the Title Page, the illustrative print figure, under Reference Numeral 604, Line 1, delete "initated?" and insert -- initiated? --, therefor.

In the Specification

In Column 1, Line 17, delete "(ORACP0176P)" and insert -- (ORACP0176P), --, therefor.

Signed and Sealed this
Eighth Day of August, 2023

*Katherine Kelly Vidal*

Katherine Kelly Vidal
*Director of the United States Patent and Trademark Office*